United States Patent [19]

Lee et al.

[11] Patent Number: 4,477,597

[45] Date of Patent: Oct. 16, 1984

[54] HIGHER DENSITY ION EXCHANGE RESINS OF METAL COMPOUND PRECIPITATED WITHIN PORES

[75] Inventors: John M. Lee; William C. Bauman, both of Lake Jackson; Richard A. Wolcott, Richwood; John L. Burba, III, Angleton, all of Tex.

[73] Assignee: The Dow Chemical Company, Midland, Mich.

[21] Appl. No.: 307,829

[22] Filed: Oct. 2, 1981

[51] Int. Cl.³ .......................... B01J 39/20; B01J 41/14
[52] U.S. Cl. ....................................................... 521/28
[58] Field of Search ........................................... 521/28

[56] References Cited

U.S. PATENT DOCUMENTS

| | | | |
|---|---|---|---|
| 2,809,943 | 10/1957 | Pye et al. | 521/28 |
| 3,352,800 | 11/1967 | Smith | 521/28 |
| 4,284,726 | 8/1981 | Shigetomi | 521/28 |

FOREIGN PATENT DOCUMENTS

| | | | |
|---|---|---|---|
| 521223 | 1/1956 | Canada | 521/28 |
| 553220 | 2/1958 | Canada | 521/28 |
| 732817 | 6/1955 | United Kingdom | 521/28 |

*Primary Examiner*—Joseph L. Schofer
*Assistant Examiner*—Peter F. Kulkosky
*Attorney, Agent, or Firm*—W. J. Lee

[57] ABSTRACT

Macroporous ion exchange resins having increased apparent density are provided by incorporating into said resins a weighting agent which is of greater apparent density than the resin itself. Such weighted resins exhibit reduced bed expansion when used with upflow streams, with relatively dense liquids, and with relatively viscous liquids.

19 Claims, No Drawings

HIGHER DENSITY ION EXCHANGE RESINS OF METAL COMPOUND PRECIPITATED WITHIN PORES

BACKGROUND OF THE INVENTION

It has been previously proposed to increase the density of ion exchange resins by brominating the polymer backbone to which the active exchange sites are attached. The method is costly and generally results in reducing the overall capacity of the resin. The principal benefit to be derived from increasing the density is that such weighted resin is able to withstand faster flow rates during upflow in an exchange column without having resin particles become entrained in the fluid upflow. In addition to the flow rate upwardly in the resin column, the viscosity of the fluid is also determinative of the amount of resin entrainment.

There is a need for ion exchange resins which have increased density which permit faster upflow rates of fluids through the resin without encountering detrimental amounts of entrainment of resin particles in the fluid.

It is an object of the present invention to fill the need for such higher density ion exchange resins.

A further object is to provide higher density ion exchange resins for use with fluids having relatively high or substantial viscosities.

Yet another object is to provide weighted ion exchange resins wherein the weighting ingredient does not substantially lessen the exchange capacity of the ion exchange resin.

Still other objects will become apparent to persons skilled in the art upon reading this disclosure.

SUMMARY OF THE INVENTION

Macroporous ion exchange resins having increased apparent densities are prepared by deposition of higher density insoluble materials within the pores of said resins. The so-prepared higher density ion exchange resins have reduced bed expansion when subjected to upflow of fluids through ion exchange columns and are also useful with fluids that have a greater density than the apparent density of normal untreated ion exchange resins and are also useful with viscous liquids; these higher apparent density ion exchange resins are not as subject to entrainment or floating in upflowing fluids as the normal untreated resins.

As used herein, the term "insoluble materials" when used in referring to the weighting agents within the resins, means that the weighting agent is at least substantially insoluble or virtually insoluble in the liquids in which the weighted resins are prepared or employed. The weighting agents may be provided in the resin either before or after the ion exchange functional groups have been provided in the resin.

DETAILED DESCRIPTION

The macroporous ion exchange resins may be of the anion exchange variety or of the cation exchange variety or of the type resin which contains both anion exchange sites and cation exchange sites. By "macroporous" it is meant that any pores or voids present in the resin structure are large enough to permit entry of molecules ranging in size from dissolved molecules to finely-divided solid particles. The so-called "gel-type" resins do not normally contain pores or voids large enough to facilitate embedment therein of the weighting agents unless such pores or voids are created by removal of transient components from the resin gel, such as by evaporation of easily vaporized ingredients or by leaching-out of soluble ingredients.

Macroporous ion exchange resins which are available commercially may be employed, such as those which have been offered commerically under the tradenames of DOWEX, AMBERLYST, DUOLITE, and others.

The cation exchange resins are those capable of exchanging cations and this capability is provided by polymers (resins) having functional pendent acid groups on the polymer chain, such as carboxylic and/or sulfo groups. The anion exchange resins are those capable of exchanging anions and this capability is provided by polymers (resins) having functional pendent base groups on the polymer chain, such as ammonium or amine groups. Polymers (resins) having both types of exchange groups are also within the purview of the present invention.

Examples of macroporous strong-acid exchange resins are the sulfonated styrene-divinylbenzene copolymers such as offered commercially under the tradenames AMBERLYST 15, AMBERLYST XN1005, AMBERLYST XN1010 and DOWEX MSC-1.

Acid resins of intermediate strength have also been reported, such as those containing functional phosphonic or arsonic groups.

Macroporous weak-acid resins include those having functional groups of, e.g., phenolic, phosphonous, or carboxylic. Some common weak-acid resins are those derived by crosslinking of acrylic, methacrylic or maleic acid groups by use of a crosslinking agent such as ethylene dimethacrylate or divinylbenzene. DUOLITE C-464, is a tradename applied to a resin having functional carboxylic groups.

Among the macroporous strong-base resins are those which, notably, contain quaternary ammonium groups pendent from a poly (styrene-divinylbenzene) matrix. AMBERLYST A26, AMBERLYST 27 and DOWEX MSA-1 are tradenames of strong-base resins reported as having amine functionality derived from trimethylamine. DOWEX MSA-2 is a tradename of a macroporous strong-base resin reported as having amine functionality derived from dimethylethanolamine.

Macroporous weak-base anion exchange resins generally contain functional groups derived from primary, secondary, or tertiary amines or mixtures of these. Functional amine groups are derived from condensation products (resins) of aliphatic polyamines with formaldehyde or with alkyl dihalides or with epichlorohydrin, such as those under the tradenames DOWEX WGR and DOWEX WGR-2.

Other macroporous weak base resins are prepared by reaction of an amine or polyamine with chloromethylated styrene-divinylbenzene copolymer beads, such as DOWEX MWA-1, DOWEX 66, and AMBERLYST A21.

The insoluble materials deposited in the pores of the macroporous resins for the purpose of increasing the apparent density of the resin may be taken up into the pores from a liquid carrying the insoluble material as a finely-divided disperse phase. For example, some increased density of the exchange resin is attained by contacting the exchange resin with a liquid slurry or dispersion of a finely-divided weighting material and evaporating some or all of the liquid phase of the slurry or dispersion, leaving at least some of the insoluble disperse phase in the resin pores. The finely-divided weighting material may be an organic material which has a greater density than the exchange resin, e.g., halogenated polymers or polyhalocarbons, but is preferably an inorganic material, such as a metal, a metal hydroxide or a hydrated metal oxide, metal sulfide, metal phosphate, metal silicate, metal aluminate, and the like.

Preferably, however, the insoluble material is deposited within the pores of the exchange resin by in-situ precipitation from a solution carrying a precursor of the insoluble material. For example, a solution of a metal salt may be used as a means of depositing a dissolved precursor into the pores, then by reaction of the metal salt with an alkaline material, e.g., ammonia or caustic, the metal is caused to ppt. within the pores as an insoluble hydroxide or hydrated metal oxide.

In some cases, the so-deposited weighting material not only serves to increase the apparent density of the exchange resin, it can also beneficially enhance or alter the ion exchange capabilities of the exchange resin.

In the art of ion exchange, it is generally desirable and recommended that bed expansion be held to less than about 50% in order that the exchange sites not be greatly spread apart, thereby reducing the desired contact of fluid with resin. Ordinarily, then, when using upflow contact with an unrestrained bed of resin, the flow is regulated at a slow rate so as to avoid the higher bed expansion, but such slow flow rates can be unnecessarily more expensive. The present invention, by increasing the apparent density of the resin bed, provides a means for increasing the rate of upflow through the resin bed before encountering serious amounts of bed expansion.

The present invention also provides weighted resins for use with liquids which have about the same or greater density than the unweighted resin and also provides greater density resins for use with liquids having greater viscosity than, say, water. These higher density resins have a reduced tendency to float or to become entrained in such liquids. One example of viscous liquids where weighted resins are useful, is in the ion exchange treatment of sugar solutions, and the like. Thus, the reduced bed expansions obtained by using the present weighted resins, compared with unweighted resins, are found with liquids that are relatively denser or more viscous than water as well as in the upflow applications where there is an expansion of the bed even with relatively low density or low viscosity water.

The following examples are intended to illustrate some embodiments, but the invention is not limited to the particular embodiments shown.

EXAMPLE 1

For this example there is used a strong-base anion exchange resin comprising macroporous beads of poly (styrene-divinylbenzene) having pendent —N(CH$_3$)$_3$$^+$Cl$^-$ groups, commercially offered under the tradename DOWEX MSA-1.

About 100 cc of the resin is saturated with a saturated solution of mercury acetate, suction filtered, and placed in a column. H$_2$S gas is passed slowly through the column to convert (ppt.) the mercury acetate to mercury sulfide within the resin beads. The HgS-containing resin is washed thoroughly and dried.

The increased apparent density of the weighted resin is apparent in the reduced bed expansion at given upflow rates of de-ionized water through the bed in comparison with the bed expansion obtained under the same conditions, at ambient temperature, with untreated resin as a control. The data are in Table I.

TABLE I

| Flow Rate | % Bed Expansion | |
| GPM/ft.$^2$ | Weighted Resin | Unweighted Resin |
| --- | --- | --- |
| 1.0 | 7 | 32 |
| 1.7 | 11 | 50 |
| 2.0 | 13 | 58 |
| 3.0 | 20 | 87 |
| 3.5 | 24 | 103 |
| 4.0 | 27 | 117 |
| 6.2 | 43 | — |
| 7.0 | 50 | — |
| 10.8 | 113 | — |

EXAMPLE 2

For this example there is used a weak-base anion exchange resin comprising macroporous beads of poly (styrene-divinylbenzene) having pendent —N(CH$_3$)$_2$H$^+$Cl$^-$ groups, commercially offered under the tradename DOWEX 66.

The resin is caused to be weighted by soaking the resin in an AlCl$_3$ aqueous solution, followed by neutralization of the resin. Sodium aluminate and HCl are metered into the resin until the desired Al content is obtained. The Al(OH)$_3$ content in the resin is about 1.3 mmoles/cc of resin. The beginning apparent density of the resin is 1.02 gm/cc and the apparent density of the weighted resin is 1.10 gm/cc.

Bed expansion of the weighted resin in comparison with the unweighted resin is shown in Table II below, using a column having a diameter of 0.92 cm, using various rates of upflow of ambient temperature de-ionized water.

TABLE II

| Flow Rate | % Bed Expansion | |
| GPM/ft.$^2$ | Weighted Resin | Unweighted Resin |
| --- | --- | --- |
| 1.03 | 17 | 48 |
| 1.78 | 24 | 82 |
| 2.06 | 27 | 92 |
| 2.60 | 50 | 121 |
| 4.00 | 92 | — |
| 4.78 | 120 | — |

EXAMPLE 3

In this Example, DOWEX MSA-1 (a strong-base styrene-DVB resin) is weighted with CuS by soaking the resin with a CuCl$_2$.2H$_2$O solution, followed by treating with excess Na$_2$S to precipitate CuS within the resin beads. The weighted beads are washed, then dried overnight in an oven at 95° C. The unweighted apparent density of the resin is 1.04 gm/cc and the apparent weighted density is 1.12 gm/cc.

Using a water upflow at ambient temperature in an exchange column, the data in Table III are obtained, comparing weighted with unweighted resin.

TABLE III

| Flow Rate | % Bed Expansion | |
| GPM/ft.$^2$ | Weighted Resin | Unweighted Resin |
| --- | --- | --- |
| 1.0 | 13 | 30 |
| 1.6 | 21 | 50 |
| 2.2 | 29 | 68 |
| 2.9 | 39 | 83 |
| 3.7 | 50 | 112 |
| 4.3 | 59 | — |

TABLE III-continued

| Flow Rate | % Bed Expansion | |
|---|---|---|
| GPM/ft.$^2$ | Weighted Resin | Unweighted Resin |
| 7.8 | 119 | — |

EXAMPLE 4

Here, there is used a macroporous anion exchange resin with tertiary amine groups affixed to a styrene-divinylbenzene resin structure. The resin is in the amine chloride salt form and is a commercial resin sold by The Dow Chemical Company under the tradename of DOWEX MWA-1. About 34 gms of this resin is wetted with a solution of about 30 gms $ZrOCl_2.4H_2O$ in 40 gms $H_2O$. The resin absorbs all the solution and becomes free-flowing. The air-dried resin is added to a solution of 30 ml of 30% aqueous $NH_3$ and 10 ml $H_2O$. The temperature rises to about 40° C. The excess $NH_4OH$, external $Zr(OH)_4$, and the $NH_4Cl$ (which forms) are washed out by repeated contact with excess water. The washed resin is added to 40 gm. of conc. $H_3PO_4$ in 100 gm $H_2O$(pH=1.0), then added to 21 gm of $CaCl_2.2H_2O$ and neutralized with 30% $NH_3$ with warming. With 40 ml of 30% $NH_3$ added, the pH=7.0 at 70° C. The resin is then washed with raw brine (26% NaCl, 681 ppm $Ca^{++}$), the final pH is 6.7 in 26% NaCl by glass electrode. The product is 115 cc of resin composite. X-ray diffraction analysis revealed no crystallinity. The so-formed composite is useful in removing an appreciable amount of uranium values from a dilute solution containing dissolved uranium ions. The weighted resin has reduced bed expansion, compared to unweighted resin, when subjected to upflow of liquid in a column.

EXAMPLE 5

Intrusion of the selected soluble metal ion into various macroporous resins was followed by precipitation of the hydrous oxide within the resin by treatment with aqueous $NH_3$.

Depending upon the desired system DOWEX MSC-1, MSA-1, and MWA-1 ion exchange resins have all been proven to have utility. In several cases a heating step has been beneficial. This is thought to improve crystal growth but X-ray examination does not always confirm such growth. Systems which are amorphous to X-ray are still operable.

Hydrous oxides of titanium or zirconium and the partial phosphate salts of these oxides were prepared in all the above three Dow macroporous resins. In a sample preparation, $TiCl_4$ (0.6669 moles) was dissolved in $CCl_4$ then slowly added to a concentrated HCl solution. The $CCl_4$ was removed via separatory funnel and the titanium oxychloride solution (132 cc) was gravity fed to 138 cc of 20-50 mesh MSC-1 resin. Down flow of dry nitrogen eluted 235 cc of solution which by analysis showed a net 0.1395 g/cc Ti loading.

The resin after drying by continued $N_2$ flow was dumped into 150 cc of 30% $NH_3$ solution to precipitate the hydrous oxide.

Similar steps with $ZrOCl_2$ gave the corresponding resin. A secondary treatment with phosphate ions converted each hydrous oxide resin into the partial phosphate salts. These methods produced resins which were shown to have the desired higher density, stability for use in either the carbonate or acidic sulfate systems now applied in the uranium recovery industry and in addition, significantly higher loadings were found for the titanium resins in the carbonate cycles.

A comparative study of the effect of the higher densities may be shown graphically with percent bed expansion plotted as a function of flow rate per square foot of bed. This of course relates to potential productivity increases per unit of resin bed. Resins loaded to half breakthrough with synthetic fed containing 0.51 g. $U_3O_8$/liter upon elution gave peaks as high as 11 g/liter.

The data (which may be graphed, if desired, to show the relative slopes of curves) are given in tabular form in Table IV below. In the table the "Resin Identity" is as follows:

MSA-1-Cl refers to a commercially available strong-base anion exchange resin in its chloride form sold under the tradename of DOWEX;

MWA-1-Cl is similar to MSA-1-Cl except that it is a weak-base resin;

MSA-1-Ti refers to MSA-1 into which a Ti hydrate has been incorporated according to this invention;

MWA-1-ZrP refers to the weak-base resin into which a zirconia hydrate, modified with phosphate, is incorporated;

MWA-1-TiP refers to the weak-base resin into which a titania hydrate, modified with phosphate, is incorporated.

The resins without the addition of the metal hydrates of the present invention are included in the table for comparison purposes.

TABLE IV
PERCENT BED EXPANSION OF THE RESINS AT SELECTED FLOW RATES

| Resin Identity | Flow Rates in GPM/ft.$^2$ | | | | | |
|---|---|---|---|---|---|---|
| | 2 | 4 | 6 | 8 | 10 | 12 |
| MSA-1-Cl | 60 | 120 | — | — | — | — |
| MWA-1-Cl | 38 | 75 | 115 | — | — | — |
| MSA-1-Ti | 20 | 38 | 57 | 77 | 95 | 115 |
| MWA-1-ZrP | 16 | 27 | 40 | 53 | 66 | 79 |
| MWA-1-TiP | 7 | 14 | 25 | 42 | 55 | 70 |

EXAMPLE 6

Using the weak-base resin DOWEX MWA-1, about 300 cc of resin in chloride form was loaded in a column and the excess of 1.34 gravity $ZrOCl_2$ solution was passed through. When influent and effluent densities were approximately equal, the resin was dried in a stream of dry nitrogen to a free flowing state. The resin then was poured into 200 cc of 30% aqueous $NH_3$, stirred and then washed to remove the hydrous oxide which resulted from adhering liquor, and thus was not precipitated within the resin substrate. To further extend the useful pH range the resin thus prepared was then heated in 30-40% $H_3PO_4$ to crystallize the α form of $ZrO(H_2PO_4)_2$ within the resin. The zirconium phosphate so prepared is very resistant to acid attack and thus extends the usefulness of the resin to the very low pH ranges such as may be encountered in some of the acid cycles. The weighted resin has reduced bed expansion, compared with unweighted resin, when subjected to upflow of liquid in a column.

EXAMPLE 7

The following listed weighted resins are derived by in-situ precipitation of a soluble precursor within the resin beads. Those with $PO_4$ groups are derived by further reaction with phosphonic acid groups and those with sulfide groups are derived by further reaction with sulfide compounds.

| Weighting Compound | Macroporous Ion Exchange Resin |
| --- | --- |
| $ZrO(H_2PO_4)_2$ | DOWEX MSA-1 |
| $SiO_2$ | DOWEX MSA-1 |
| $Co_2O_3.H_2O$ | DOWEX MWA-1 |
| $CuO$ | DOWEX MWA-1 |
| $HgS$ | DOWEX MSA-1 |
| $ZrO(OH)_2$ | DOWEX MSC-1 |
| $ZrO(OH)_2$ | DUOLITE C-464 |
| $Fe(OH)_3$ | DOWEX MSC-1 |
| $Sn(OH)_4$ | DOWEX MSC-1 |
| $Pb(OH)_4$ | DOWEX MSA-1 |
| $Co_2O_3.H_2O$ | DOWEX MSC-1 |
| $PbO(H_2PO_4)_2$ | DOWEX MSA-1 |
| $PbS$ | DOWEX MSA-1 |
| $PbO(OH)_2$ | DOWEX MSA-1 |
| $Co_2O_3.H_2O$ | DOWEX MSA-1 |
| $Al(OH)_3$ | DOWEX MWA-1 |
| $Al(OH)_3$ | DOWEX MSA-1 |
| $Al(OH)_3$ | DOWEX 66 |
| $Al(OH)_3$ | DUOLITE C-464 |
| $LiCl.2Al(OH)_3$ | DOWEX MWA-1 |
| $CoCl_2.2Al(OH)_3$ | DOWEX MWA-1 |
| $NiCl_2.2Al(OH)_3$ | DOWEX MWA-1 |
| $MgCl_2.2Al(OH)_3$ | DOWEX MWA-1 |
| $CuS$ | DOWEX MSA 1 |

In addition, weighting compounds such as $ZrO(OH)_2$ have been incorporated in macroporous resin beads, such as poly(styrene-divinylbenzene), before having acid or base functional groups affixed thereto.

We claim:

1. A method for providing a macroporous ion exchange resin showing reduced upflow bed expansion, said method comprising depositing within the pores of said resin a substantially insoluble weighting agent thereby preparing a composite material which has a higher apparent density than the apparent density of the starting resin, wherein the depositing of the weighting agent into said resin is accomplished by the process comprising incorporating into the pores of said resin at least one soluble compound of Zr, Ti, Si, Sn, Pb, Co, Fe, Ni, Cu or Hg and reacting said soluble compound with a reagent which converts the soluble compound in-situ in the pores to at least one insoluble metal or metal compound.

2. A method for increasing the apparent density of macroporous resin, said method comprising incorporating into the pores of said resin at least one soluble compound of Zr, Ti, Si, Sn, Pb, Co, Fe, Ni, Cu or Hg, then adding a reactant which converts in-situ, in said pores, said soluble compound to an insoluble metal or metal compound, thereby creating a resin composite having a higher apparent density than the apparent density of the resin itself.

3. The method of claim 2 wherein ion exchange functional groups are incorporated into the composite.

4. The method of claim 2 wherein the macroporous resin contains ion exchange functionalities.

5. The method of claim 2 wherein the macroporous resin is a cation exchange resin.

6. The method of claim 2 wherein the macroporous resin is an anionic exchange resin.

7. The method of claim 2 wherein the incorporated metal compound is a compound of Zr or Ti.

8. The method of claim 2 wherein the incorporated metal compound is a compound of Si, Sn, or Pb.

9. The method of claim 2 wherein the incorporated metal compound is a compound of Co, Fe, or Ni.

10. The method of claim 2 wherein the incorporated metal compound is a compound of Cu.

11. The method of claim 2 wherein the incorporated metal compound is a compound of Hg.

12. The method of claim 2 wherein the incorporated metal compound is a soluble compound of Zr or Ti, the reactant which converts said compound to an insoluble compound is ammonia, and where said insoluble compound is converted to a partial phosphate salt by reaction with phosphate ions.

13. The method of claim 2 wherein the incorporated soluble metal compound is a Hg compound, and where said Hg compound is reacted with a sulfide to convert it to insoluble HgS.

14. The method of claim 2 wherein the incorporated soluble metal compound is a Cu compound, and where said Cu compound is reacted with a sulfide to convert it to insoluble CuS.

15. The method of claim 2 wherein the incorporated soluble metal compound is a Zr compound and the in-situ precipitated insoluble metal compound is $ZrO(OH)_2$.

16. The method of claim 2 wherein the incorporated soluble metal compound is a Co compound and the in-situ precipitated insoluble metal compound is $Co_2O_3.H_2O$.

17. The method of claim 2 wherein the incorporated soluble metal compound is a Pb compound and the in-situ precipitated insoluble metal compound is $Pb(OH)_4$.

18. The method of claim 2 wherein the incorporated soluble metal compound is a Pb compound, the in-situ precipitated insoluble Pb compound is $PbO(OH)_2$, and where the $PbO(OH)_2$ is reacted with phosphate ions to form $PbO(H_2PO_4)_2$.

19. The method of claim 2 wherein the incorporated soluble metal compound is an Fe compound and where the in-situ precipitated insoluble compound is $Fe(OH)_3$.

* * * * *